(12) United States Patent
Wienhold

(10) Patent No.: US 6,966,562 B1
(45) Date of Patent: Nov. 22, 2005

(54) MULTIPLE MODE CHUCK

(76) Inventor: James L. Wienhold, 3336 Idaho Ave. South, Minneapolis, MN (US) 55426

( * ) Notice: Subject to any disclaimer, the term of this patent is extended or adjusted under 35 U.S.C. 154(b) by 336 days.

(21) Appl. No.: 10/161,148

(22) Filed: May 31, 2002

Related U.S. Application Data

(60) Provisional application No. 60/294,769, filed on May 31, 2001.

(51) Int. Cl.[7] .......................................... B23B 31/107
(52) U.S. Cl. .................................... 279/75; 279/155
(58) Field of Search ........................... 279/14, 22, 30, 279/74, 75, 127, 137, 905, 155; 408/240

(56) References Cited

U.S. PATENT DOCUMENTS

| | | | | |
|---|---|---|---|---|
| 2,135,861 A | * | 11/1938 | Thompson | 409/266 |
| 2,405,772 A | | 8/1946 | Adams et al. | 10/135 |
| 2,926,020 A | | 2/1960 | Dayton et al. | 279/75 |
| 3,039,781 A | | 6/1962 | Bilz | 279/75 |
| 3,398,965 A | | 8/1968 | Cox | 279/30 |
| 3,521,895 A | | 7/1970 | Smith | 279/22 |
| 3,658,351 A | | 4/1972 | Benjamin et al. | 279/1 B |
| 3,788,658 A | | 1/1974 | Benjamin et al. | 279/75 |
| 3,945,653 A | | 3/1976 | Falchle | 279/97 |
| 4,184,692 A | | 1/1980 | Benson et al. | 279/75 |
| 4,209,182 A | | 6/1980 | Sheldon | 279/75 |
| 4,290,617 A | | 9/1981 | Yoshida | 279/75 |
| 4,381,116 A | | 4/1983 | Futter | 279/62 |
| 4,514,117 A | | 4/1985 | Scott | 408/239 |
| 4,577,875 A | * | 3/1986 | Miyakawa | 279/75 |
| 4,594,036 A | | 6/1986 | Hogenhout | 408/240 |
| 4,692,073 A | | 9/1987 | Martindell | 408/239 |
| 4,710,079 A | | 12/1987 | Smith et al. | 409/234 |
| 4,711,457 A | | 12/1987 | Wezel | 279/65 |
| 4,858,939 A | | 8/1989 | Riggs | 279/75 |
| 4,900,202 A | | 2/1990 | Wienhold | 408/240 |
| 4,990,038 A | | 2/1991 | DeLong | 408/127 |
| 5,013,194 A | | 5/1991 | Wienhold | 408/240 |
| 5,062,749 A | * | 11/1991 | Sheets | 279/75 |

(Continued)

FOREIGN PATENT DOCUMENTS

| | | | |
|---|---|---|---|
| DE | 1552404 | 12/1969 | 31/4 |

OTHER PUBLICATIONS

Article entitled "Faster, Better Drilling for Finish Carpenters," *Fine Homebuilding*, by Bruce Greenlaw, Feb./Mar. 1996.

(Continued)

*Primary Examiner*—Daniel W. Howell
(74) *Attorney, Agent, or Firm*—Kinney & Lange, P.A.

(57) ABSTRACT

A multi-mode quick-release chuck assembly is adapted for receiving tool bits having varying shank cross-sectional-sizes. The chuck assembly includes a hub having a longitudinal hub bore for receiving tool bits, a locking mechanism to retain the tool bits, and a sleeve. The sleeve is slidable between a first and a second sleeve position to engage and disengage the locking mechanism from the tool bit. Within the longitudinal hub bore is an elastic body, and a slidably disposed plunger. The longitudinal hub bore is adapted to receive a first tool bit having a first profile, and the plunger is adapted to receive a second tool bit having a second profile that is smaller than the first profile. The elastic body acts to bias the plunger towards the forward end of the hub into a first position. The first tool bit is inserted into the longitudinal hub bore displacing the plunger.

21 Claims, 14 Drawing Sheets

U.S. PATENT DOCUMENTS

| | | | | |
|---|---|---|---|---|
| 5,222,848 | A | * | 6/1993 | Kuang-Wu ............... 408/239 R |
| 5,417,527 | A | | 5/1995 | Wienhold ................... 408/239 |
| 5,464,229 | A | | 11/1995 | Salpaka ....................... 279/30 |
| 5,722,805 | A | | 3/1998 | Griffin ........................ 408/239 |
| 6,059,296 | A | | 5/2000 | Baeder ......................... 279/20 |
| 6,135,462 | A | | 10/2000 | Robison ..................... 279/137 |
| 6,199,872 | B1 | | 3/2001 | Hasan .......................... 279/30 |
| 6,270,085 | B1 | * | 8/2001 | Chen et al. ................... 279/22 |
| 6,325,393 | B1 | * | 12/2001 | Chen et al. ................... 279/22 |
| 6,457,916 | B2 | * | 10/2002 | Wienhold ................... 408/240 |

OTHER PUBLICATIONS

Brochure entitled "Insty-Bit® Patented Quick-Change System," 1994, by Insty-Bit, Inc., Minneapolis, MN 55405.

Brochure entitled "Insty-Bit Patented Quick Change System," 1993/1994, by Wienhold Associates, Minneapolis, MN 55426.

Brochure entitled "Insty-Bit® Quick-Change Drilling System," 1991-1993, by Wienhold Associates, Minneapolis, MN 55426.

* cited by examiner

MULTIPLE MODE CHUCK

CROSS REFERENCE TO RELATED APPLICATION(S)

This application claims priority from provisional application No. 60/294,769 filed May 31, 2001, for "MULTIPLE MODE CHUCK" by James L. Wienhold.

BACKGROUND OF THE INVENTION

This invention relates to chuck assemblies for tool bits, and more particularly, to a quick release chuck adapted to receive and retain a plurality of tool bits having varying shank cross-sectional sizes.

Tool bits include tools used for drilling and driving fastener devices such as screws, nuts and bolts, and other work elements requiring rotational motion. The traditional or "incremental" design typically consists of a mechanism that houses three adjustable jaws which protrude at an angle into a bore. An external sleeve is coupled to the jaws via internal gear teeth. When a tool shank is inserted into the bore, the sleeve is rotated by a user. As the sleeve is rotated in one direction, the jaws are forced towards the center of the bore to clamp a tool bit and tighten the sleeve into place (e.g. using a chuck key). When the sleeve is rotated in the opposite direction, the jaws are opened. This chuck style is able to accommodate a variety of tool shank sizes and shapes. However, changing a tool bit takes time and extensive operator involvement.

Tools having an alternate approach to chuck design allow for tool bits to be exchanged in a "quick-change" manner. The American National Standards Institute has a specification for such tools known as ANSI B 107.4-1982, which refers to driving and spindle ends for portable powered and hand-held machines which use tool bits. Tool bits in accordance with the standard have a hexagonally configured shank with a circumferential groove formed into the shank. The circumferential groove has a flat, bottom portion disposed between two radiused shoulder portions. The standard reflects an alternate and pervasive use of such tool bits and the large inventory of tools available.

One type of quick-change or quick-release chuck uses a spring biased sleeve disposed on a spindle or hub, as described in U.S. Pat. Nos. 4,900,202 and 5,013,194, both of which are incorporated by reference herein. Quick-release chucks of this type require the use of tools that have shanks of a consistent size (typically, ¼" hex shank), usually having hexagonal cross sections. A spring biased sleeve is used to retain the tool bit in the chuck. The sleeve urges a detent ball into contact with the circumferential groove of the tool bit and maintains the ball in position by a shoulder (or cam surface) mounted on the sleeve. The ball is urged into contact with the groove and maintained in position by a compression spring disposed between the spindle and the sleeve. A ring secured to the hub limits movement of the sleeve in one direction, and the compression spring limits movement of the sleeve in the opposite direction.

The tool bit is prevented from being axially extracted from the chuck by the ball. The spring biased shoulder is urged against the detent ball which locks it against a retaining face on the tool bit. Attempting to extract the tool bit from the bore without release of the ball pulls the ball against the retaining face. The resulting force prevents extraction of the tool bit from the shank receiving bore. To release the tool bit from the receiving bore, the user must retract the sleeve. The retracted sleeve acts to compress the spring, which removes the shoulder from engagement with the ball and thereby allows the ball to move out of the circumferential groove of the tool bit. Thus, quick-release chucks allow for an operator to easily and quickly insert and remove tool bits from the chuck without requiring the use of a chuck key or requiring the loosening or tightening of jaws onto the shank of the tool bit.

Previous quick-release systems are only able to accommodate a single cross-sectional size tool bit shank. Thus, order to provide sufficient rotational torque, the cross-sectional size of the receiving bore of the quick-release chuck must be substantially the same as the cross-sectional size of the tool bit shank in order for the quick-release chuck to rotate the tool bit as the chuck rotates. A quick-release chuck assembly is needed in the art which quickly and efficiently exchanges tool bits having different cross-sectional sites.

BRIEF SUMMARY OF THE INVENTION

The invention in one form is a quick-release chuck assembly for a plurality of tool bits, where each tool bit has a shank and a groove extending circumferentially about the shank. The chuck assembly comprises a hub having a forward end and a longitudinal axis. The hub has a longitudinal hub bore having a terminating face, a bore wall disposed along the longitudinal axis, and is adapted to receive a first tool bit shank having a first cross-sectional profile. A plunger is slidably disposed within the longitudinal hub bore. The plunger has a forward face proximate the forward end, a rearward end and an outer wall in fixed rotational engagement with the bore wall of the longitudinal hub bore wall. A longitudinal plunger bore is disposed in the plunger extending rearwardly from the forward face along the longitudinal axis. The longitudinal plunger bore forms a plunger inner bore wall and terminates at a terminating end face that is generally perpendicular to the longitudinal axis of the plunger. The plunger bore is adapted to receive a second tool bit shank having a second cross-sectional profile smaller than the first cross-sectional profile of the first tool bit. An elastic body is disposed between the rearward end of the plunger and the terminating face of the longitudinal hub bore. The elastic body acts to bias the plunger towards the forward end of the hub into a first plunger position.

In an alternative embodiment, the invention is a method for the insertion and extraction of a plurality of tool bits from a quick-release chuck assembly. The method comprises the insertion of the first tool bit into the longitudinal hub bore of the hub, whereby the first tool bit contacts the plunger and slidably disposes the plunger within the longitudinal hub bore from the first plunger position to a second plunger position. When the first tool bit is extracted from the longitudinal hub bore, the plunger is disposed from the second plunger position to the first plunger position. The method further comprises insertion of the second tool bit into the longitudinal plunger bore of the plunger and extracting the second tool bit from the longitudinal plunger bore.

BRIEF DESCRIPTION OF THE DRAWINGS

The present invention will be further explained with reference to the attached figures, wherein like structure is referred to by like numerals throughout the several views.

While the above-identified drawing figures set forth one several embodiment of the invention, other embodiments are also contemplated, as noted in the discussion. In all cases, this disclosure presents the present invention by way of representation and not limitation. It should be understood that numerous other modifications and embodiments can be devised by those skilled in the art which fall within the scope and spirit of the principles of this invention.

DETAILED DESCRIPTION

Figure 1:
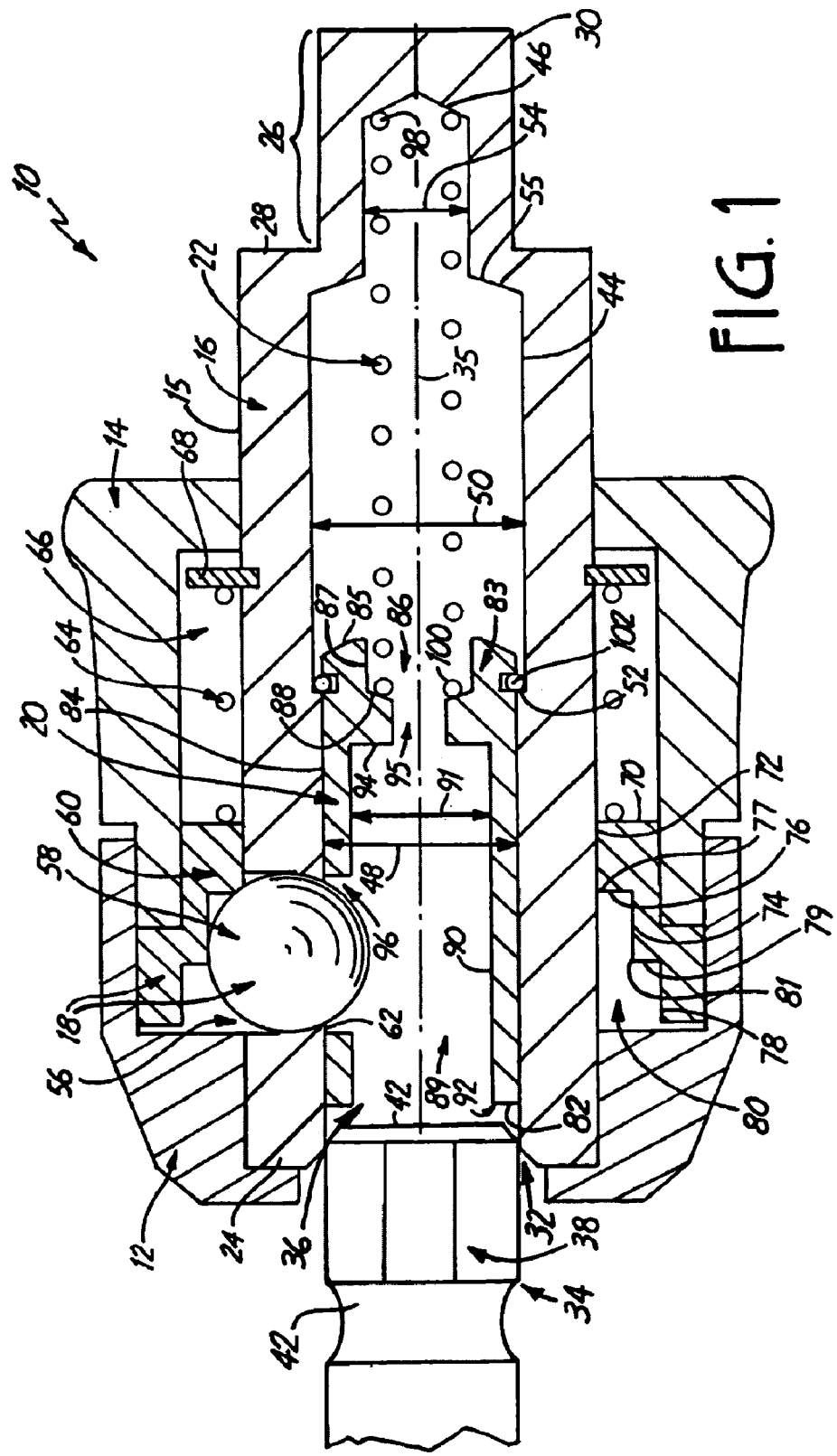
FIG. 1 is a longitudinal cross-sectional view of the present inventive chuck with a first tool bit.

The present invention is a multi-mode quick-release chuck shown at in FIG. 1. The chuck includes a nose cap 12, a sleeve 14, a hub 16, a locking mechanism 18, a plunger 20, and an elastic member 22. The nose cap 12 is disposed annularly around a forward end 24 of the hub 16 and houses the locking mechanism 18. The movable sleeve 14 is disposed around an outer cylindrical surface 25 of the hub 16.

The hub 16 terminates in the forward end 24 and has a spindle portion 26 extending from a rearward end 28 of the hub 16. The spindle portion 26 fits into a rotating tool, such as a drill (not shown). Preferably, the spindle portion 26 includes flat exterior faces 30 which align with the jaws of an adjustable jaw chuck to form a secure connection. A forward opening 32 is centered in the forward end 24 of the hub 16 for admitting a first tool bit 34 into a longitudinal hub bore 36. The longitudinal hub bore 36 receives a shank portion 38 of the first tool bit 34. The shank portion 38 of the first tool bit 34 has a cross-sectional profile adapted to mate with the cross-sectional profile of the longitudinal hub bore 36. The profile in commercial tool bits is typically a hexagonal shaped although other profiles will suffice, so long as the shank portion 38 and longitudinal hub bore 36 mate for coupled axial rotation. When the profile of the shank portion 38 of the first tool bit 34 is hexagonal, the longitudinal hub bore 36 is also preferably hexagonally shaped in lateral profile to receive the shank portion 38 of the first tool bit 34.

The shank portion 38 also includes a circumferential groove 40 near a shank end 42 thereof.

The longitudinal hub bore 36 extends rearwardly from the forward opening 32 into the hub 16 and is disposed along a longitudinal axis 35 of the chuck 10 forming an inner bore wall 44 in the hub 16. As shown in FIG. 1, the longitudinal hub bore 36 terminates in the spindle portion 26 of the hub 16 along a rear terminating end 46 which is a face generally perpendicular to the longitudinal axis 35 of the chuck 10. In an alternate embodiment, the longitudinal hub bore 36 terminates in the hub 16 without extending into the spindle portion 26.

As shown at a position axially rearward from the forward end 24, the longitudinal hub bore 36 changes from a primary profile 48 to a larger lateral cross-sectional intermediate profile 50 creating an annular shoulder 52 which is generally perpendicular to the longitudinal axis 35 of the chuck 10. Axially rearward from the annular shoulder 52 and proximate to the rear terminating end 46 of the longitudinal hub bore 36, the intermediate profile 50 changes to a inner profile 54, extending into the spindle portion 26. The inner profile 54 preferably has a smaller lateral cross-sectional dimension than the lateral cross-sectional dimension of the primary profile 48. The transition from the intermediate profile 50 to the inner profile 54 creates a radially extending inner wall slant 55.

The locking mechanism 18 retains the first tool bit 34 within the longitudinal hub bore 36. In one embodiment, the locking mechanism 18 comprises a radially extending hub bore 56, a detent ball 58 and an annular locking ring 60. The locking ring 60 is fixed to or made integral with the sleeve 14. Although the locking ring 60 and detent ball 58 are used as the locking mechanism 18 to lock the tool bit 34 into the longitudinal hub bore 36, a person skilled in the art would realize that other known quick-change style locking mechanisms may be used in the inventive chuck without departing from the spirit and scope of the invention, such as an over center washer or radially biased pin.

The radial hub bore 56 communicates with the longitudinal hub bore 36 and extends from the longitudinal hub bore 36 through the hub 16. A detent ball 58 is disposed in the radial hub bore 56 and is sized to fit loosely in the radial hub bore 56 permitting the ball 58 to move axially within the radial hub bore 56 and partially extend into the longitudinal hub bore 36 so as to selectively lock or release the first tool bit 38 in the longitudinal hub bore 36 of hub 16. The detent ball 58 is held within the radial hub bore 56 by a retaining rim 62 having a smaller diameter than the radial bore 56. The retaining rim 62 prevents the ball from completely passing from the radial hub bore 56 into the longitudinal hub bore 36.

In one embodiment, the detent ball 58 is held in the engaged or locked position (as shown) by the locking ring 60 when the moveable sleeve 14 is in a maximum forward position. The moveable sleeve 14 is biased toward the forward end 24 of the hub 16 by a compression spring 64. The compression spring 64 is held in a spring cavity 66 formed by the moveable sleeve 14 between the moveable sleeve 14 and the hub 16. The compression spring 64 bears against a flange 68 mounted around the outer cylindrical surface 15 of the hub 16 and the locking ring 60 of the moveable sleeve 14.

The annular locking ring 60 includes a rearward orientated face 70 which is generally perpendicular to the longitudinal axis 35 of the chuck 10 for providing a surface against which the compression spring 64 can bear. Forward from and adjacent to the rearward face 70 is an axially extending inner face 72 which has substantially the same diameter as an outer cylindrical surface 15 of the hub 16. While the diameters are substantially the same, enough tolerance is provided between the outer cylindrical surface 15 of the hub 16 and the inner face 72 so as to allow axial movement of the sleeve 14 over the outer cylindrical surface 15 of the hub 16. Forward from the inner face 72 is a radially extending intermediate face 74 having a greater diameter than the inner face 72. The locking ring 60 has a forward orientated face 76, substantially perpendicular to the longitudinal axis 35 of the chuck 10, which extends between the inner face 72 and the intermediate face 74. The inner face 72 and the forward orientated face 76 meet to form a shoulder 77. Forward from the intermediate face 74 is a outer face 78 adjacent a forward cavity 80 of the moveable sleeve 14 and having a diameter greater than the intermediate face 74. Between the intermediate face 74 and the outer face 78 is a second forward orientated face 79, which is substantially perpendicular to the longitudinal axis 35 of the chuck 10. The intermediate face 74 and the second forward orientated face 79 meet to form a shoulder 81.

In the engaged or locked position, the detent ball 58 is locked against the retaining rim 62 of the radial hub bore 56 as the locking ring 60 is urged forward (by the compression spring 64) into substantial alignment with the radial hub bore 56 and into contact with the detent ball 58. The intermediate face 74 and the shoulder 77 make contact with the detent ball 58 allowing the locking ring 60 to apply force on the detent ball 58 in directions both normal and parallel to the longitudinal axis 35 of the chuck 10. As the sleeve is urged axially forward, the intermediate face 74 engages the detent ball 58 forcing the ball 58 radially inward. The diameter of the ball 58 is greater than that of the retaining rim 62, thus preventing the ball 58 from extending completely into the longitudinal hub bore 36. It should be understood that although a particular locking ring 60 profile is discussed and shown, a person skilled in the art would realize that any one of a plurality of profiles can be used to urge the detent ball 58 radially into the longitudinal hub bore 36. Alternative examples of shoulder profiles are disclosed in U.S. Pat. No. 4,900,202 (discussed previously). In addition, other means for urging radially inwardly may be employed, such as a bias pin, radially biased ball, or even a tilted washer arrangement.

The plunger 20 is slidably and coaxially disposed within the longitudinal hub bore 36. The plunger 20 has a radially extending front face 82 proximate the forward end 24 of the hub 16, a substantially radially extending rearward end 83 and an outer wall 84. In one embodiment, the rearward end 83 includes a rearward face 85 and a recess 86. The rearward face 85 is preferably shaped so as to extend slightly axially as well as radially. The recess 86 is formed by a first recess face 87 and a second recess face 88. The first recess face 87 is forward from the rearward face 85 and is generally perpendicular to the rearward face 85. The second recess face 88 is forward from the first recess face 87 and is generally perpendicular to the first recess face 87. The outer wall 84 is in fixed rotational engagement and slidable axial engagement with the inner bore wall 44 of the longitudinal hub bore 36. The plunger 20 is slidable within the longitudinal hub bore 36 between a first plunger position and a second plunger position. In the first plunger position, as shown in FIG. 1, the front face 82 of the plunger 20 is disposed proximate to the forward end 24 of the hub 16.

The plunger 20 has a longitudinal plunger bore 89 extending into the plunger 20 along the longitudinal axis 35 of the chuck 10 rearwardly from the front face 82 of the plunger 20, thereby forming a plunger inner bore wall 90. The longitudinal plunger bore 89 has a plunger inner profile 91. The inner bore wall 90 and the front face 82 meet to form a circumferential shoulder 92. The front face 82 of the circumferential shoulder 92 is a substantially flat surface and is generally perpendicular to the longitudinal axis 35 of the chuck 10. The longitudinal plunger bore 89 terminates in the plunger 20 at a terminating end 94 which is a face generally perpendicular to the longitudinal axis 35 of the chuck 10. Optionally, the plunger has an aperture 95 which extends from the longitudinal plunger bore 89 through the rearward end 83 to the recess 86.

In one embodiment, the plunger 20 has at least one radially extending plunger bore 96 that communicates with the longitudinal plunger bore 89. The radial plunging bore 96 is in substantial alignment with the radial hub bore 56 to permit the detent ball 58 to extend through the radial hub bore 56 and into the radial plunger bore 96. In alternate embodiments more than one detent ball and radially extending bores can be utilized. In another alternative embodiment, the plunger bore 96 is in the shape of a slot.

The elastic member 22 is disposed between the rearward end 83 of the plunger 20 and the terminating face 46 of the longitudinal hub bore 36. The elastic member 22 biases the plunger 20 toward the forward end 24 of the hub 16 to the first plunger position. In one embodiment, the elastic member 22 is a compression spring. In alternate embodiments, the elastic member 22 can be any elastomeric, compressible or expandable member. A first end 98 of the spring 22 is in contact with the terminating face 46 of the longitudinal hub bore 36, while the second end 100 of the spring 22 is in contact with the recess 86 of the plunger 20. The recess 86 creates a stable mounting point for the second end 100 of the elastic member 22. To prevent the elastic member 22 from completely expelling the plunger 20 from the longitudinal hub bore 36, a retaining clip 102 is fitted around the outer wall 84 of the plunger 20 adjacent the rearward end 83 of the plunger 20. As the plunger 20 is biased toward the forward end 24 of the hub 16 by the compression spring 22, the retaining clip 102 abuts against the shoulder 52 of the longitudinal hub bore 36 thereby preventing the plunger 20 from traveling any further toward the forward end 24 of the hub 16. The retaining clip 102 is spaced from the terminating face 46 of the longitudinal hub bore 36 so that the compression spring 22, even when extended to the maximum extent possible, is still in compression.

Figure 2:
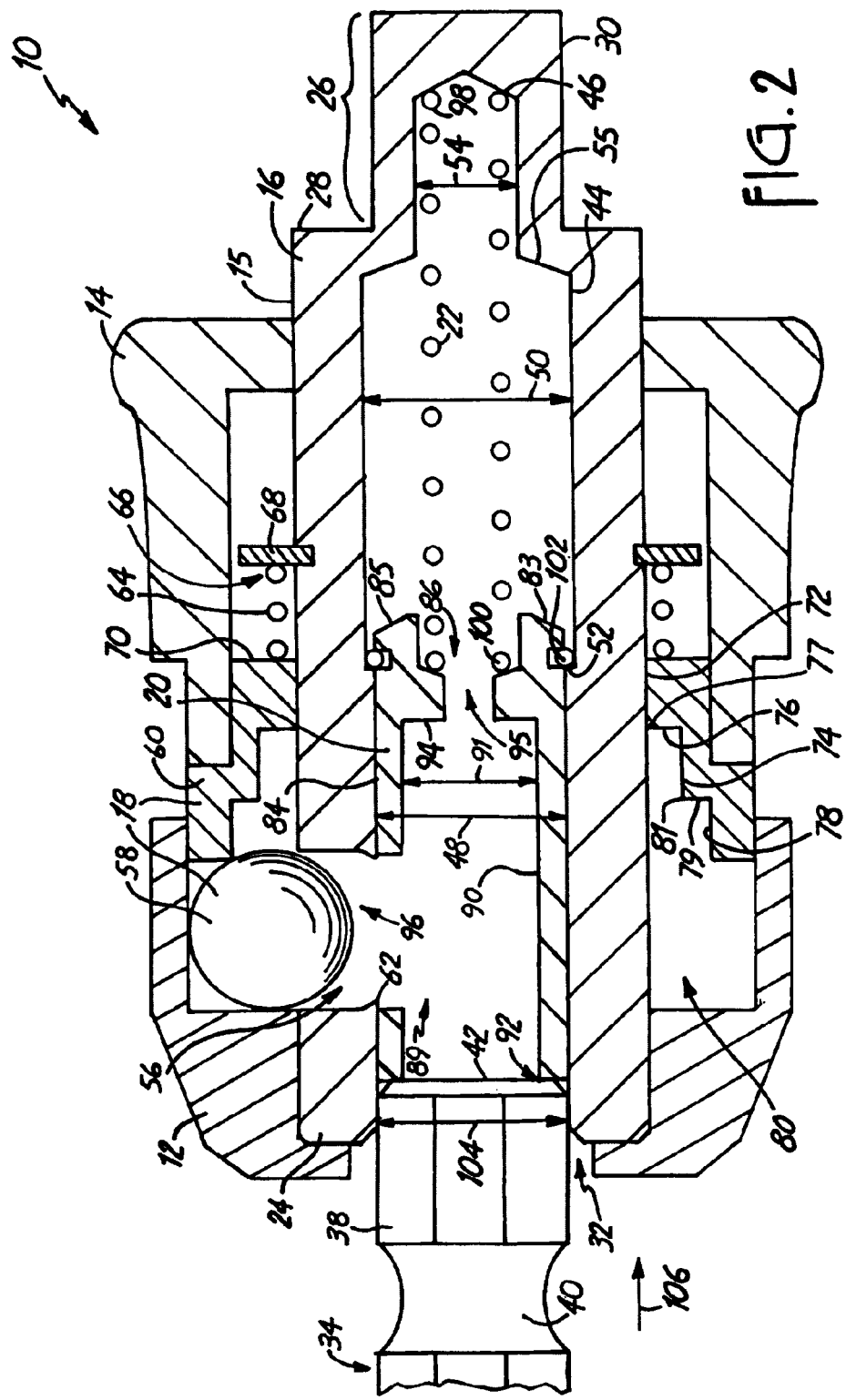
FIG. 2 is a cross-sectional view of one embodiment of the present inventive chuck shown in an unlocked position and receiving the first tool bit.

As shown in FIG. 2, the first tool bit 34 has a first profile 104. In one embodiment, the first profile 104 has a lateral cross-sectional dimension of approximately 0.4375 inches (although other dimensions may be utilized). Although the cross-sectional dimension of the first tool bit 34 is given, other embodiments would utilize other dimensions. As the shank end 42 of the first tool bit 34 is inserted in the direction shown by arrow 106 within the longitudinal hub bore 36, the first tool bit 34 abuts against the front face 82 of the plunger 20. The first tool bit 34, with the first profile 104, is too large to be receivable by the plunger inner profile 91, and thus not receivable into the longitudinal plunger bore 89.

Figure 3:
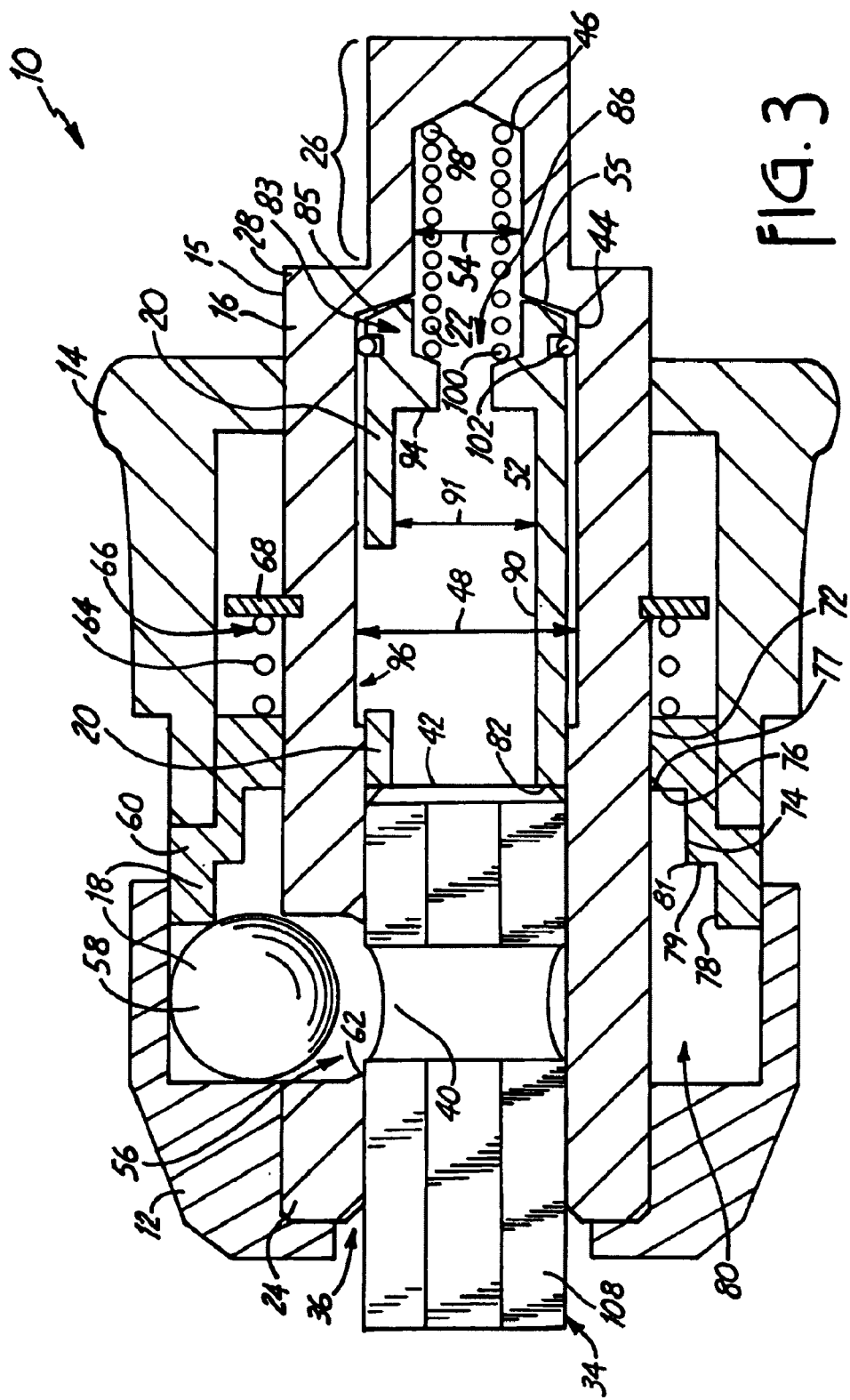
FIG. 3 is a cross-sectional view of one embodiment of the present inventive chuck shown receiving the first tool bit.

To receive the first tool bit 34 within the longitudinal hub bore 36, the moveable sleeve 14 is translated rearward (by an operator) relative to the hub 16 (in the direction of arrow 106). Such movement retract the locking ring 60 from alignment with the radial hub bore 56 and the radial plunger bore 96, thus allowing the detent ball 58 to travel radially out of the radial plunger bore 96 and the radial hub bore 56 partially into the forward cavity 80. When the shank portion 38 of the first tool bit 34 is inserted into the longitudinal hub bore 36, the first tool bit shank end 42 abuts against the circumferential shoulder 92 of the plunger 20 and slides the plunger 20 rearward relative to the forward end 24 of the hub 16, thereby compressing the spring 22. Thus, insertion of the first tool bit 34 slides the plunger 20 from the first plunger position, shown in FIG. 2, to the second plunger position, shown in FIG. 3.

In the second plunger position, the rearward face 85 of the plunger 20 is disposed adjacent the terminating face 46 of the longitudinal hub bore 36. The shape of the rearward face 85 enables a complimentary fitting with the inner wall slant 55 of the longitudinal hub bore 36. The rearward face 85 of the plunger 20 abuts against the inner wall slant 55 and the compression spring 22 is further compressed into the spindle portion 26 of the longitudinal hub bore 36 between the recess 86 of the rearward end 83 and the terminating face 46 of the longitudinal hub bore 36.

Figure 4:
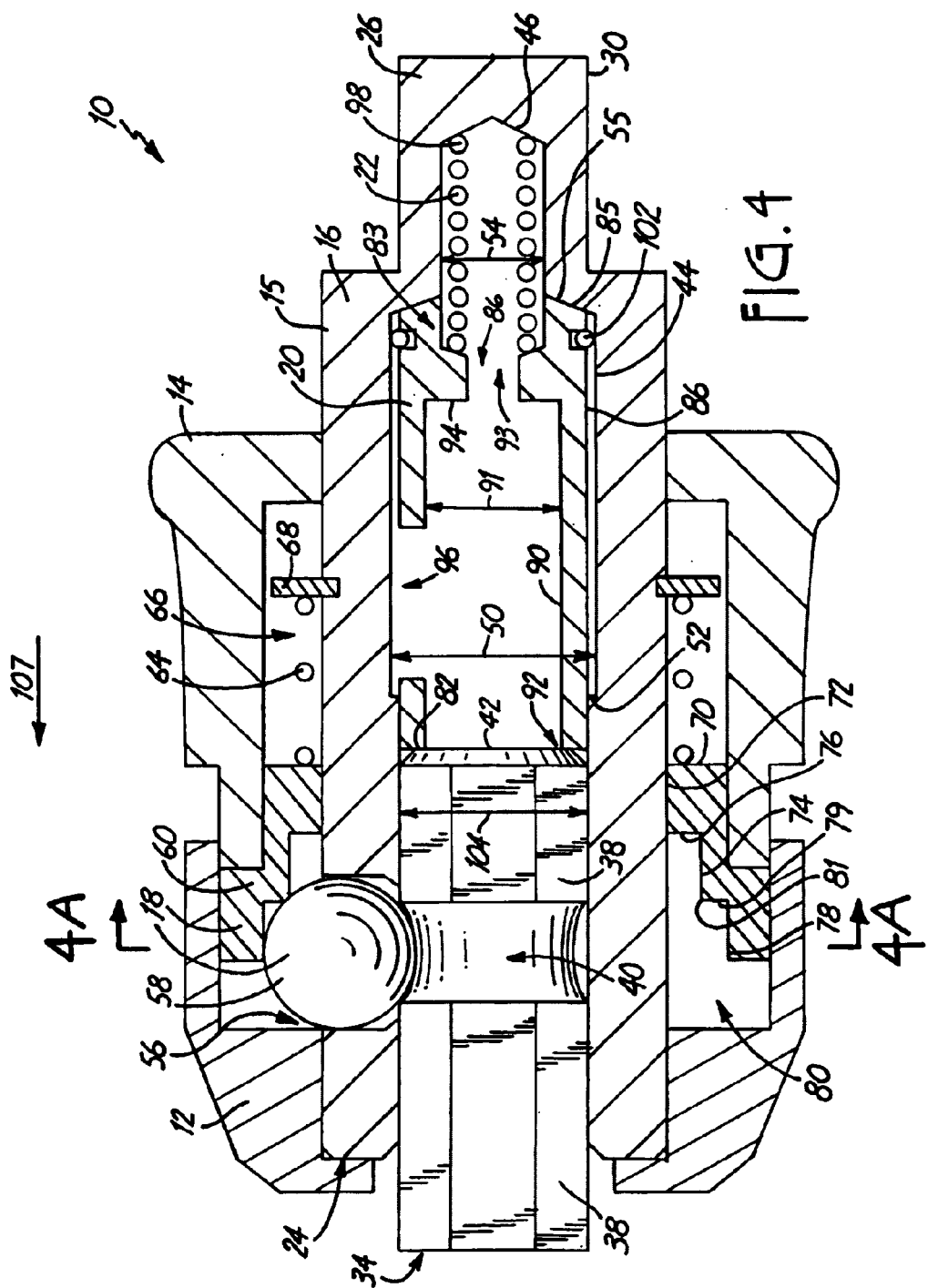
FIG. 4 is a cross-sectional view of the present inventive chuck shown in an locked position with the first tool bit.
Figure 4A:
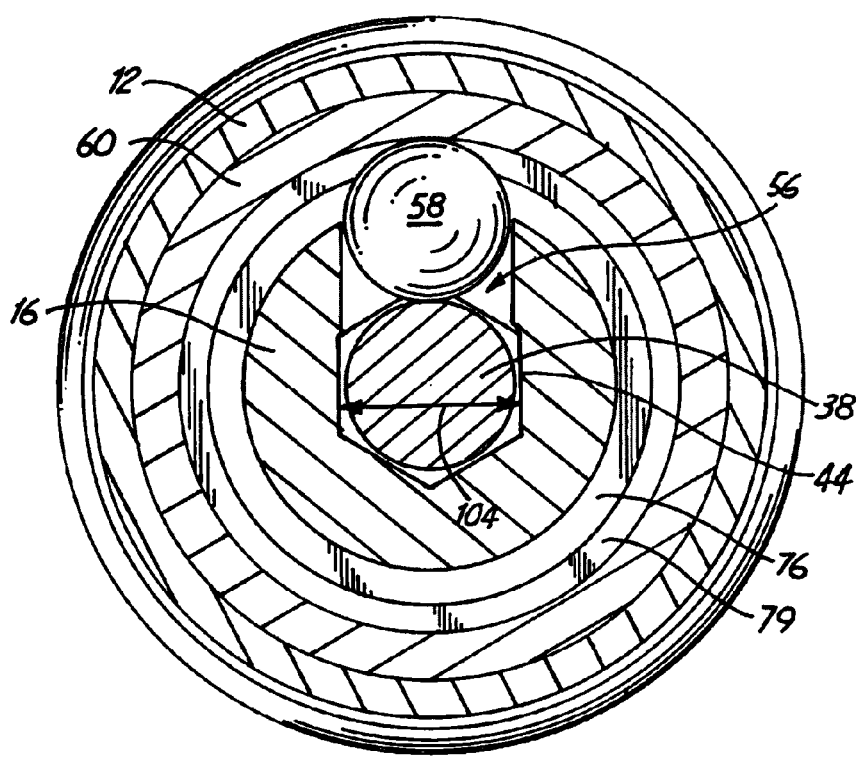
FIG. 4A is a cross-sectional view taken along line 4A of FIG. 4 with the detent ball engaged with the first tool bit.

FIG. 4 is a cross-sectional view of the chuck 10 in an locked position with the first tool bit 34. The plunger 20 is moved into the second plunger position by the first tool bit 34 and the moveable sleeve 14 is translated forward relative to the hub 16 in the direction of arrow 107 by the compression spring 64. The outer face 78 and the shoulder 81 of the locking ring 60 are in contact with the detent ball 58. The locking ring 60 urges the detent ball 58 radially inward through the radial hub bore 56 to contact with the first tool bit 34, thereby retaining the first tool bit 34 within the longitudinal hub bore 36, as shown in FIG. 4A. The hexagonal shank end 38 of the first tool bit 34 is in substantially fixed rotational engagement with the hexagonally shaped inner bore wall 44, allowing the chuck 10 to rotate the tool bit 34. Preferably, the detent ball 58 is in contact with the circumferential groove 40 of the first tool bit 34. Alternatively, the locking mechanism 18 is not limited to engagement with the first tool bit 34 only when the plunger 20 is in the second position. In an optional embodiment, the detent ball 58 can engage the first tool bit 34 received within the longitudinal hub bore 36 at any point along the length of the first tool bit 34 when the plunger 20 is in between the first and second position.

Figure 5:
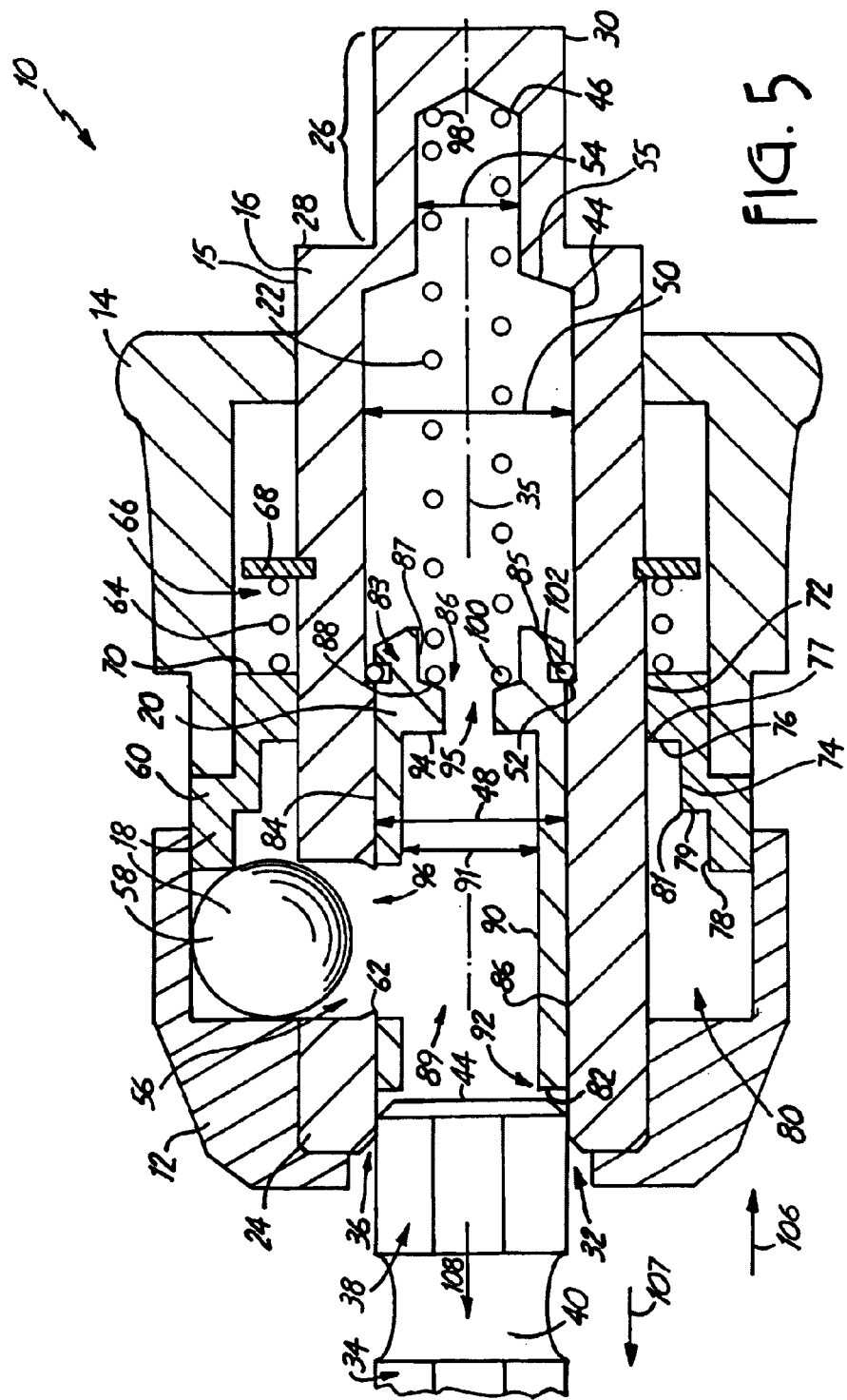
FIG. 5 is a cross-sectional view of the present inventive chuck shown in an unlocked position.

FIG. 5 is a cross-sectional view of the chuck 10 with the first tool bit 34 shown extracted from the longitudinal hub bore 36 in the direction of arrow 107. The moveable sleeve 14 is again translated rearward relative to the hub 16 (in the direction of arrow 106) so as to retract the locking ring 60, allowing the ball 58 to move radially out of the longitudinal hub bore 36. Application of an extractive axial force 108 to the first tool bit 34 results in an outward radial displacement of the detent ball 58 partially into the forward cavity 80 and out of the longitudinal hub bore 36, and thus out of contact with the first tool bit 34. An additional force supplied by the expansion of the compression spring 22 urges the plunger 20 from the second position to the first position, thereby translating the first tool bit 34 toward the forward end 24 of the hub 16.

Figure 6:
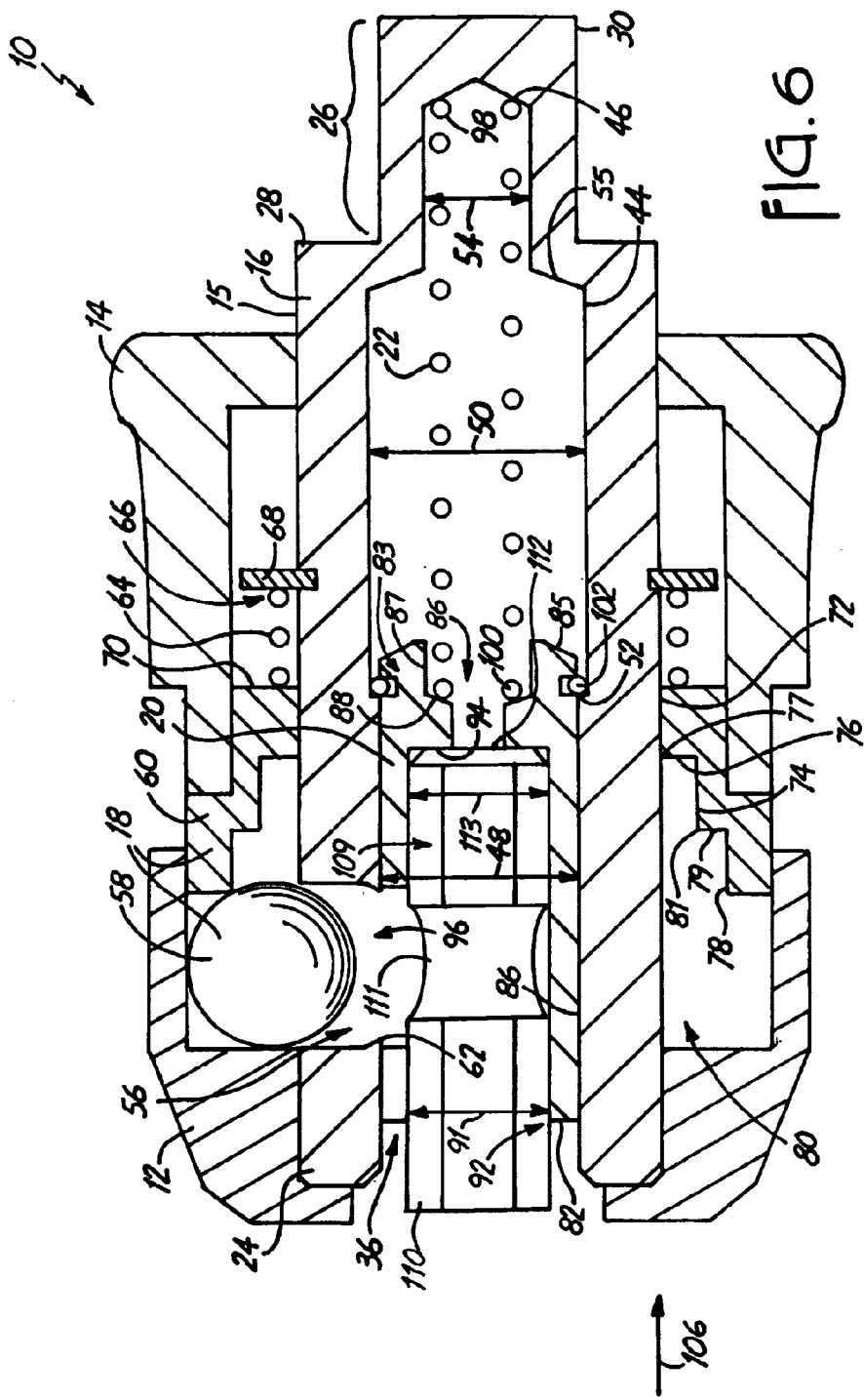
FIG. 6 is a cross-sectional view of the present inventive chuck shown in a unlocked position with the second tool bit.

FIG. 6 is a cross-sectional view of chuck 10 in an unlocked position and the longitudinal plunger bore 89 receiving a shank portion 109 of a second tool bit 110. The shank portion 109 of the second tool bit 110 is inserted into the longitudinal plunger bore 89 of the tool bit 110 in the direction of arrow 106. The shank portion 109 also includes a circumferential groove 111 near a shank end 112. The shank portion 109 of the second tool bit 110 has a second lateral cross-sectional profile 113 adapted to mate with the plunger inner profile 91 of the longitudinal plunger bore 89. The second profile 113 has a lateral cross sectional dimension that is generally smaller than the lateral cross sectional dimension of the first profile 104 of the first tool bit 34 and is therefore receivable within the longitudinal plunger bore 89. In one embodiment, the second profile 113 has a lateral cross sectional dimension of approximately 0.25 inches. Although the cross-sectional dimension of the second tool bit 110 is given, other embodiments would utilize different dimensions. The profile in commercial tool bits is typically a hexagonal shaped, although other profiles will suffice, so long as the shank portion 109 and longitudinal plunger bore 89 mate for coupled axial rotation. When the profile of the shank portion 109 of the second tool bit 110 is hexagonal, the longitudinal plunger bore 89 is also preferably hexagonally shaped in lateral profile to receive the shank portion 109 of the second tool bit 110.

In an alternate embodiment, additional profiles could be adapted to the longitudinal plunger bore 89 allowing additional tool bits of various sizes to be received within the longitudinal plunger bore 89. For example, the aperture 95 extending through the terminating end face 94 of the plunger 20 has a cross-sectional profile smaller than the cross-sectional profile 91 of the longitudinal plunger bore 89, thereby the aperture 95 forms a second inner bore wall for receiving a tool bit having a cross-sectional profile smaller than the second cross-sectional profile of the second tool bit.

The moveable sleeve 14 is translated rearward relative to the hub 16 (in the direction of arrow 106) retracting the locking ring 60 from alignment with the radial hub bore 56 and the radial plunger bore 96 thereby freeing the detent ball 58. With the plunger 20 still in the first plunger position, the plunger 20 receives the second tool bit 110 within the longitudinal plunger bore 89. When fully inserted into the longitudinal plunger bore 89, the second tool bit 110 abuts against the terminating face 94 of the longitudinal plunger bore 89.

Figure 7:
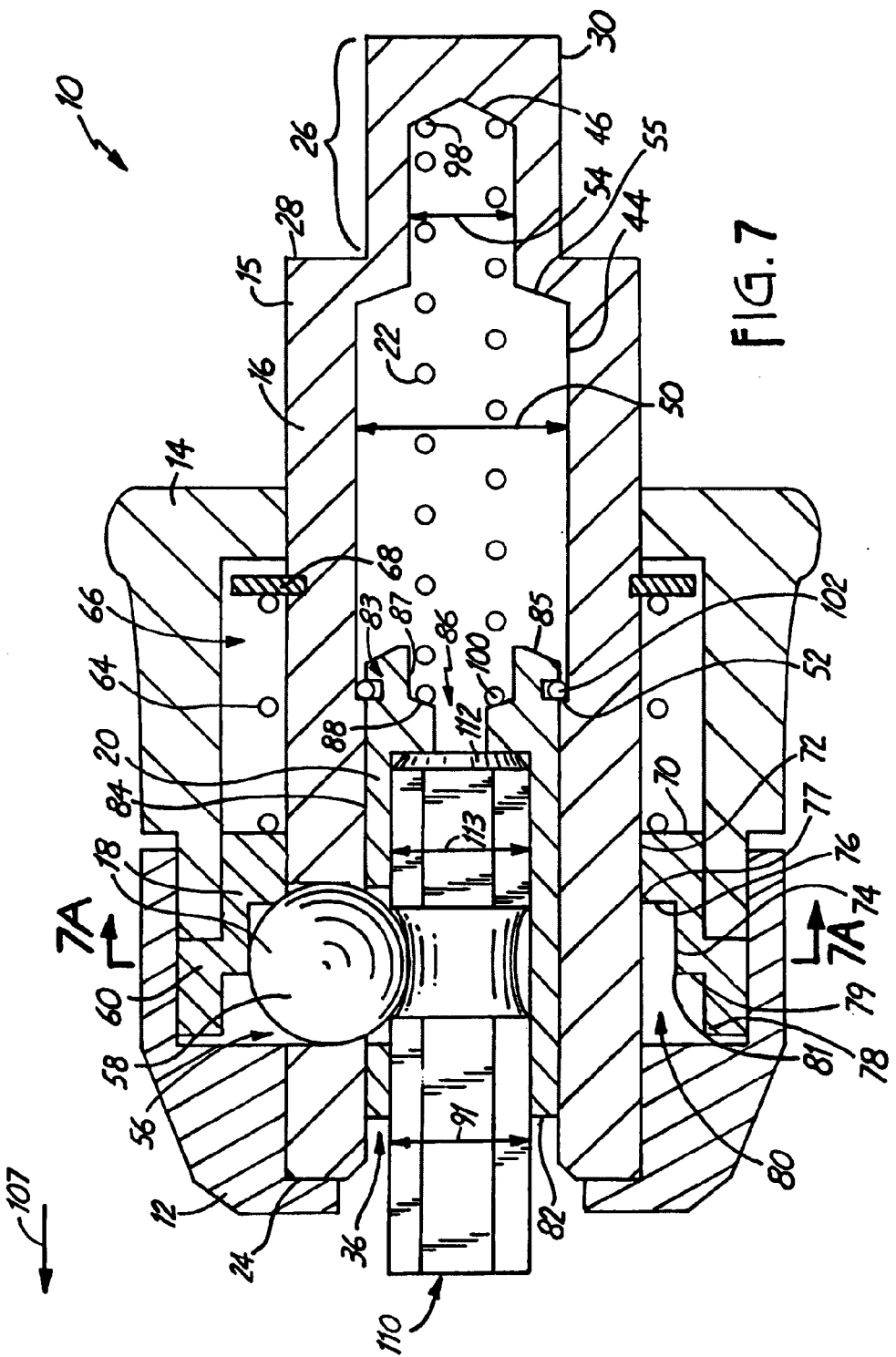
FIG. 7 is a cross-sectional view of the present inventive chuck shown in a locked position with the second tool bit.
Figure 7A:
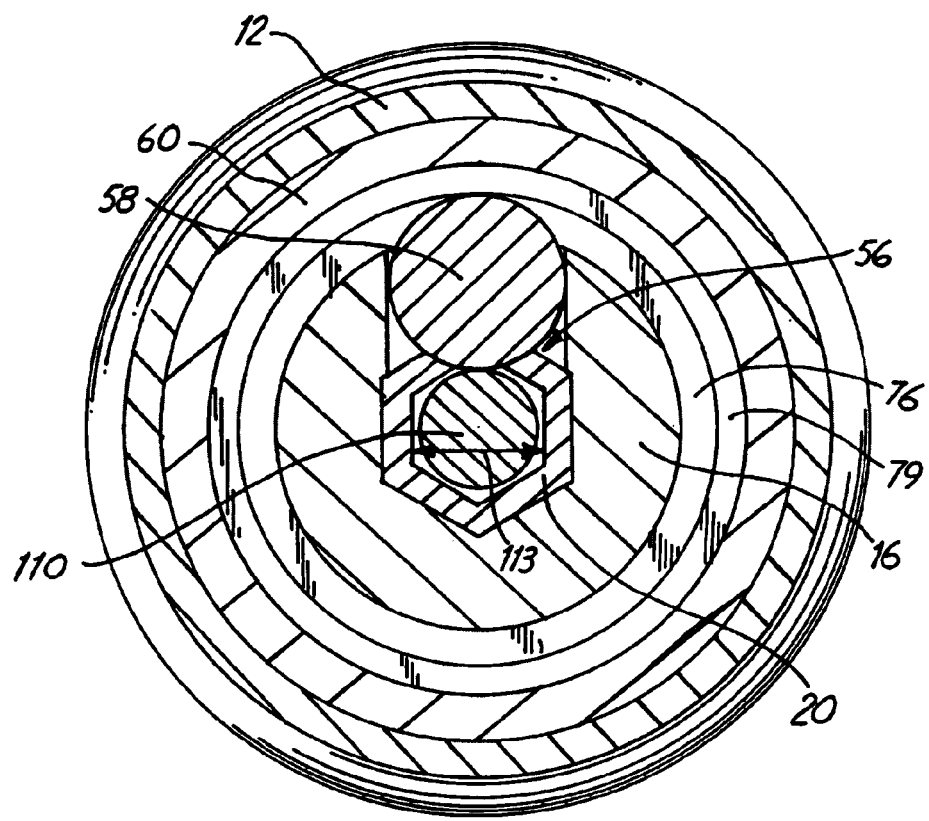
FIG. 7A is a cross-sectional view taken along line 7A of FIG. 7 with the detent ball engaged with the second tool bit.

FIG. 7 is a cross-sectional view of the chuck 10 with the second tool bit 110 in a locked position. The moveable sleeve 14 is translated forward relative to the hub 16 (in the direction of arrow 107), thereby bringing the intermediate face 74 and the shoulder 77 of the locking ring 60 into contact with the detent ball 58. The locking ring 60 urges the detent ball 58 radially inward through the radial hub bore 56 and the radial plunger bore 96 to contact the second tool bit 110 and retain the second tool bit 110 within the longitudinal plunger bore 89, as shown in FIG. 7A. Preferably, the detent ball 58 is in contact with the circumferential groove 111 of the second tool bit 110 locking the second tool bit 110 axially in the longitudinal plunger bore 89. The second tool bit 110 is in substantially fixed rotational engagement with the inner bore wall 90 of the plunger 20, allowing the chuck 10 to rotate the second tool bit 110. In an alternate embodiment, the locking mechanism 18 is engageable with the second tool bit 110 at any point along the length of the second tool bit 110 when the second tool bit 110 is within the longitudinal plunger bore 89.

Figure 8:
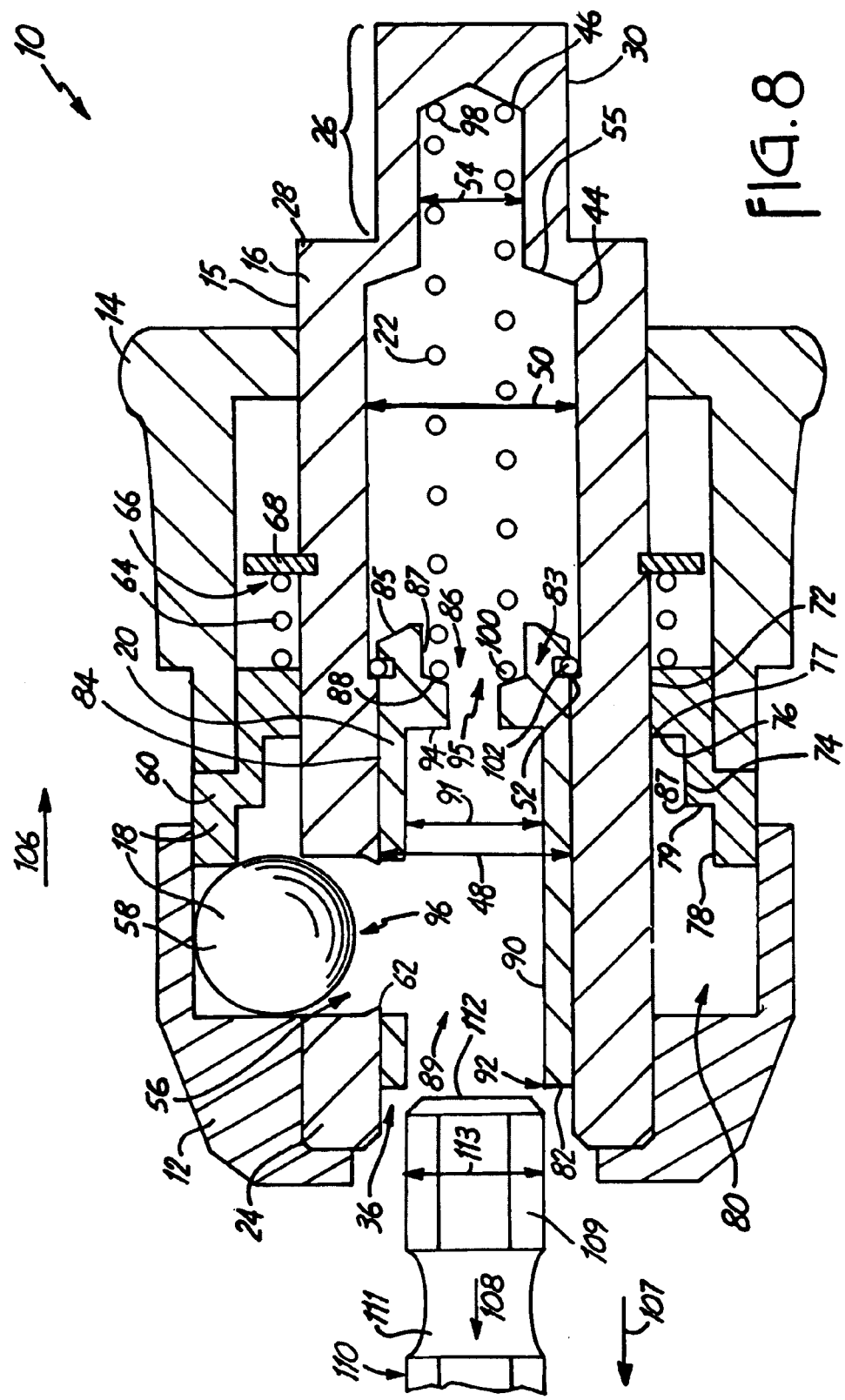
FIG. 8 is a cross-sectional view of the present inventive chuck in the unlocked position showing the extraction of the second tool bit.

FIG. 8 is a cross-sectional view of the chuck 10 in the unlocked position with the second tool bit 110 extracted from the longitudinal plunger bore 89 in the direction of 107. The moveable sleeve 14 is translated rearward relative to the hub 16 (in the direction of arrow 106), retracting the locking ring 60 from alignment with the radial hub bore 56 and the radial plunger bore 96, and thereby freeing the detent ball 58. The application of an extractive axial force 108 to the second tool bit 110 results in an outward radial displacement of the detent ball 58 by the tool bit 110. The detent ball 58 is urged out of the longitudinal plunger bore 89 and the radial hub bore 56 partially into the forward cavity 80, thereby removing the detent ball 58 from contact with the second tool bit 110. The second tool bit 110 can then be removed from the longitudinal plunger bore 89.

In FIGS. 1–8, while the movable sleeve 14 is shown moving a certain direction to lock the tool bits in place, a person skilled in the art would realize the chuck could be designed to translate the sleeve in the opposite direction without departing from the spirit and scope of the invention.

Figure 9:
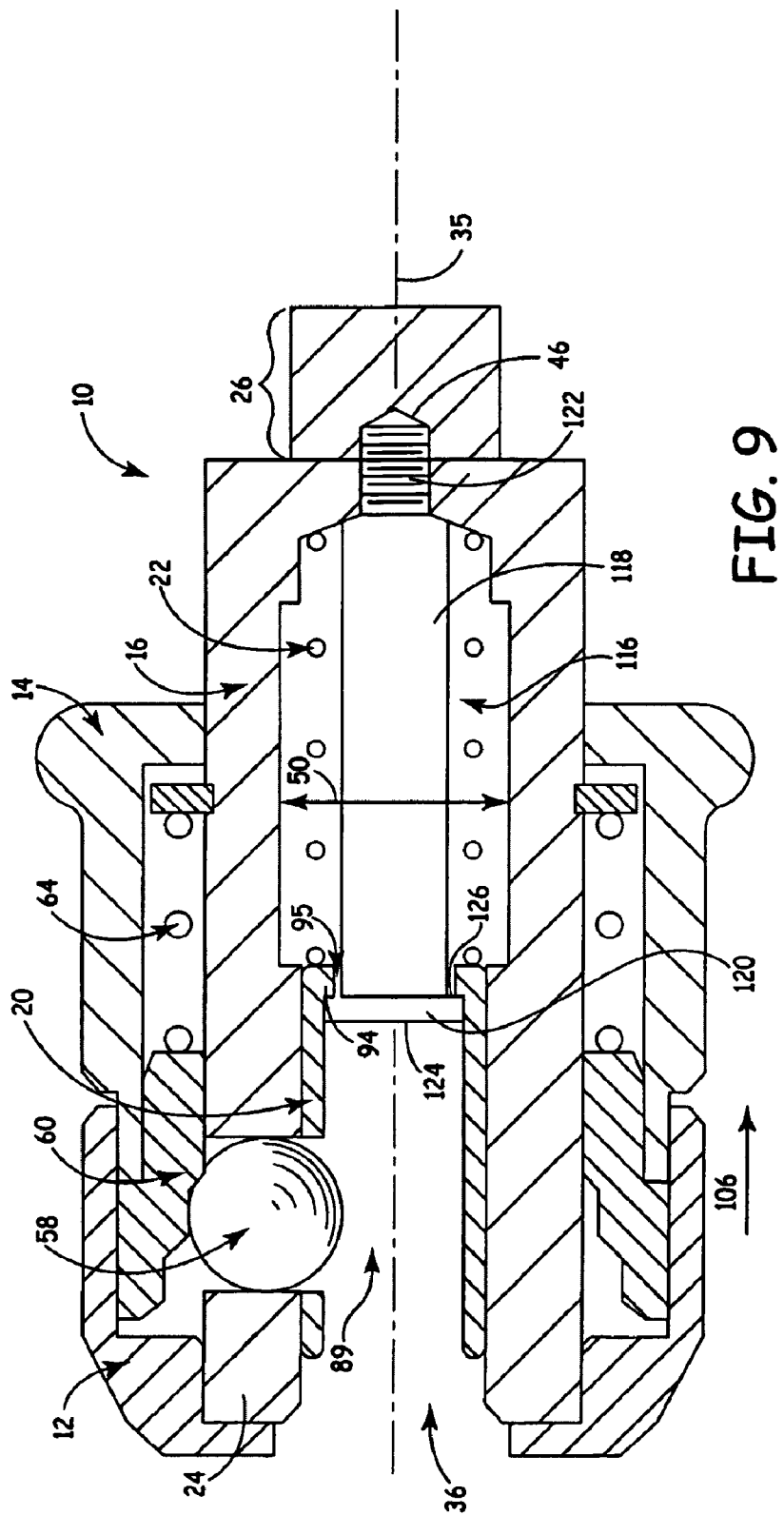
FIG. 9 is a longitudinal cross-sectional view of an alternative embodiment of the inventive chuck in the locked position having a pin therein.

FIG. 9 is a cross-sectional view of an alternate embodiment of the chuck 10 in a locked position. A pin 116 extends along the longitudinal axis 35 of the chuck 10 within the longitudinal hub bore 36. The pin 116 is a rigid member positioned within the hub 16 to prevent a tool bit from further insertion into the longitudinal hub bore 36 in the direction of arrow 106. Preferably, the pin 116 prevents a tool bit from entering the intermediate profile 50 of the longitudinal hub bore 36. The pin 116 has a shaft portion 118, a head portion 120 and a threaded portion 122. The shaft portion 118 extends through the middle of the elastic member 22 allowing the spring 22 to compress and expand as the plunger 20 is moved between the first plunger position and the second plunger position.

In one embodiment, the threaded portion 122 of the pin 116 extends into the spindle portion 26 of the hub 16 and the threaded portion 122 is threaded into the rear terminating end 46 of the hub 16 to secure the pin 116 within the longitudinal hub bore 36.

The shaft portion 118 extends through the aperture 95 of the plunger 20 with the head portion 120 positioned within the longitudinal plunger bore 89. Preferably, the head portion 120 has a larger lateral cross-section than the lateral cross-section of the shaft portion 118. The head portion 120 has a first side 124 and a second side 126. The first side 124 of the head portion 120 engages the shank end of a tool bit. The second side 126 of the head portion 120 is for contacting the terminating end 94 of the plunger 20 when the plunger 20 is in the first plunger position, as shown in FIG. 9. The plunger 20 is biased toward the forward end 24 of the hub 16 by the compression spring 22. The terminating end 94 of the plunger 20 abuts against the second side 126 of the head portion 120, thereby preventing the plunger 20 from traveling any further toward the forward end 24 of the hub 16.

Figure 10:
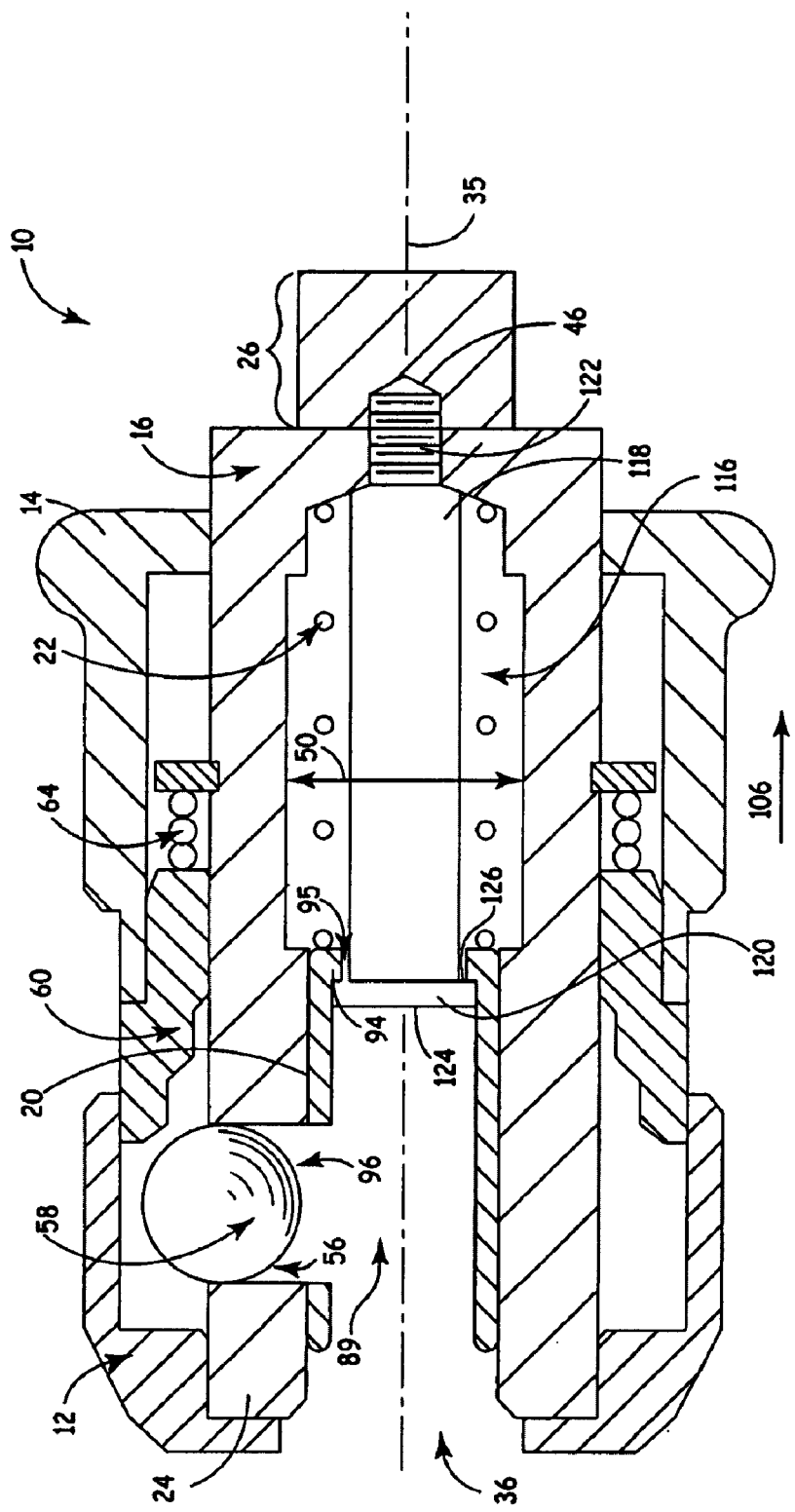
FIG. 10 is a cross-sectional view of an alternative embodiment of the inventive chuck in the unlocked position having a pin therein.

FIG. 10 is cross-sectional view of the chuck 10 in an unlocked position. The sleeve 14 translated rearward (by the operator) relative to the hub 16 (in the direction of arrow 106), retracts the locking ring 60 from alignment with the radial hub bore 56 and the radial plunger bore 96, thus allowing the detent ball 58 to travel radially out of the radial plunger bore 96 and the radial hub bore 56.

Figure 11:
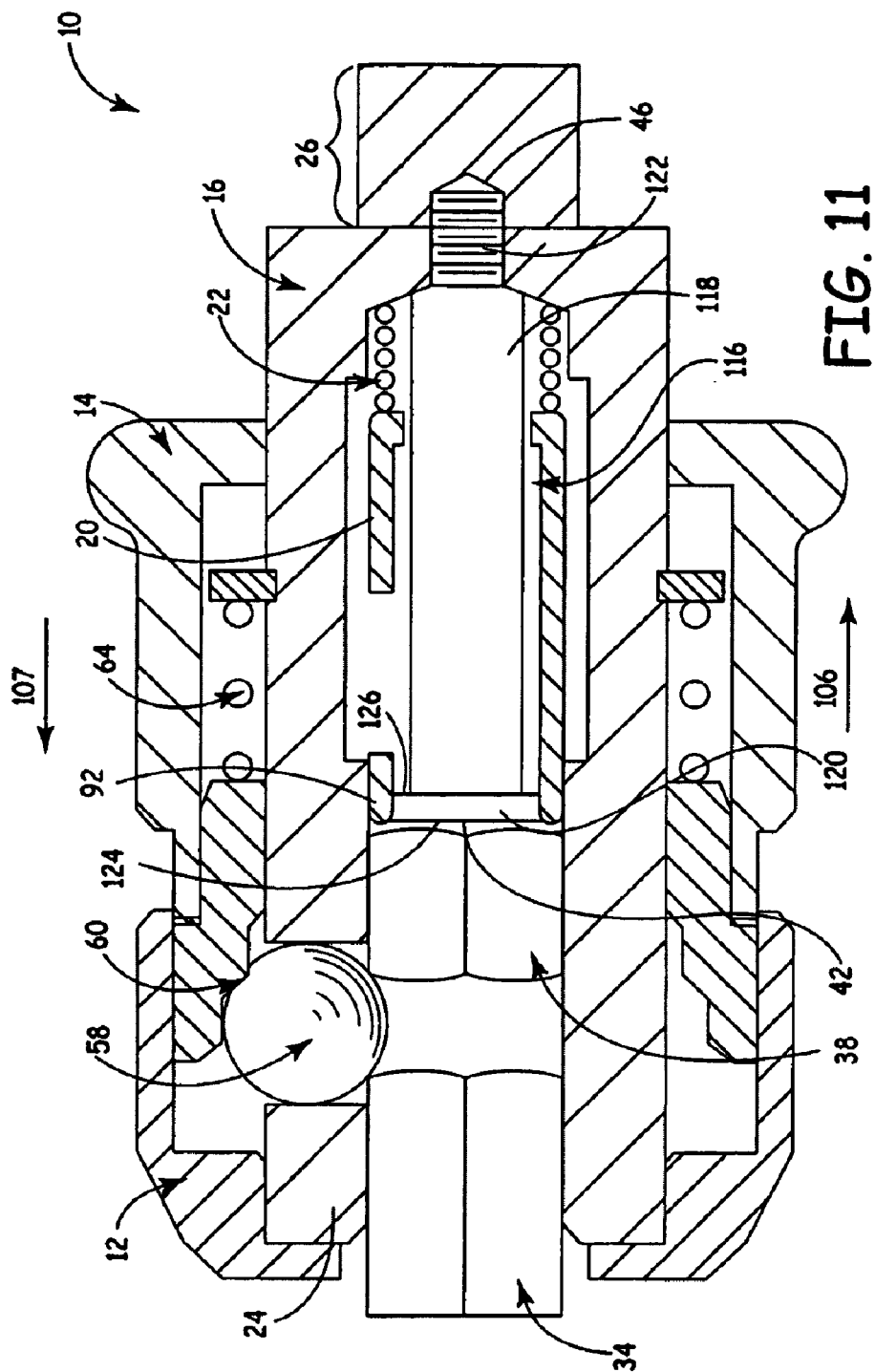
FIG. 11 is a cross-sectional view of an alternative embodiment of the inventive chuck in the locked position with the first tool bit engaged against the pin.

FIG. 11 is a cross-sectional view of the chuck 10 in the locked position with the shank portion 38 of the first tool bit 34 inserted into the longitudinal hub bore 36. The first tool bit shank end 42 abuts against the circumferential shoulder 92 of the plunger 20 and slides the plunger 20 from the first plunger position to the second plunger position. When the plunger 20 is in the second plunger position, the first tool bit shank end 42 abuts against the first side 124 of the head portion 120 of the pin 116, thereby preventing further insertion of the first tool bit 34 into the longitudinal hub bore 36 (in the direction of arrow 106). The moveable sleeve 14 is translated forward relative to the hub 16 (in the direction of arrow 107) by the compression spring 64, which urges the detent ball 58 radially inward to contact the first tool bit 34 to retain the first tool bit 34 within the longitudinal hub bore 36.

Figure 12:
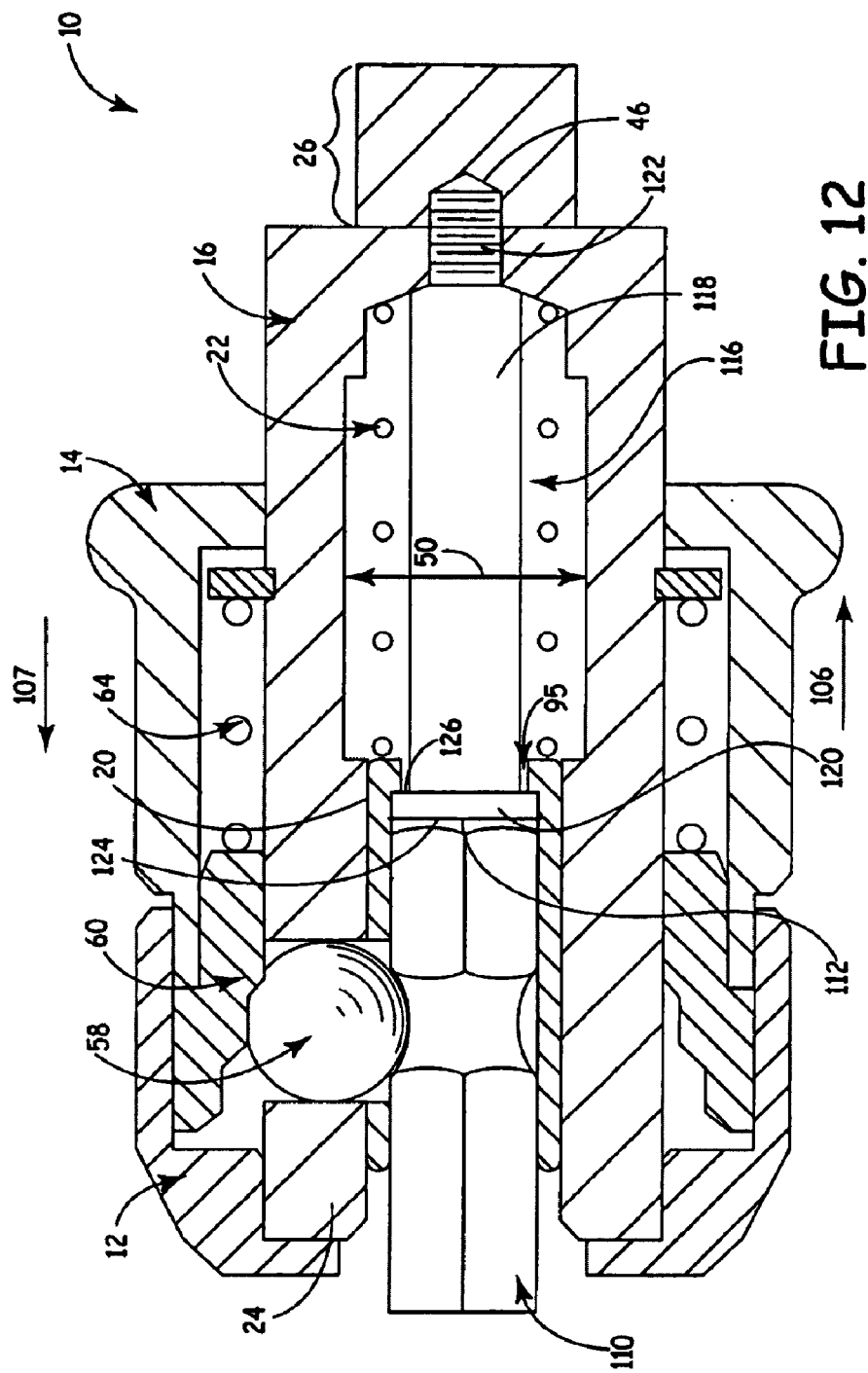
FIG. 12 is a cross-sectional view of an alternative embodiment of the inventive chuck in the locked position with the second tool bit engaged against the pin.

FIG. 12 is a cross-sectional view of the chuck 10 in the locked position with the second tool bit 110 inserted into the longitudinal plunger bore 89. The second tool bit shank end 112 abuts against the first side 124 of the head portion 120 of the pin 116, preventing further insertion of the second tool bit 110 into the longitudinal plunger bore 89 (in the direction of arrow 106). The moveable sleeve 14 is translated forward relative to the hub 16 (in the direction of arrow 107) by the compression spring 64, which urges the detent ball 58 radially inward to contact the second tool bit 110 to retain the second tool bit 110 within the longitudinal plunger bore 89.

The present invention enables a user to quickly change a plurality of tool bits having varying shank cross-sectional sizes in the same chuck assembly. A first tool bit having a first profile which is locked within the hub of the present invention can be quickly and easily exchanged for a second tool bit having a smaller second profile. Alternatively, the second tool bit can be quickly and easily exchanged for the first tool bit. The present invention chuck assembly offers a convenient and efficient way to change tool bits with different cross-sectional profiles within the same chuck assembly.

Although the present invention has been described with reference to several embodiments, workers skilled in the art will recognize that changes may be made in form and detail without departing from the spirit and scope of the invention.

What is claimed is:

1. A quick-release chuck assembly for a plurality of tool bits, each tool bit having a shank and a groove extending circumferentially about the shank, the chuck assembly comprising:

a hub having a forward end, a longitudinal axis, a longitudinal hub bore having a terminating face, and a bore wall disposed along the longitudinal axis and adapted to receive a first tool bit shank having a first cross-sectional profile;

a plunger slidably disposed within the longitudinal hub bore, the plunger having a forward face proximate the forward end, a rearward end and an outer wall in fixed rotational engagement with the longitudinal hub bore wall;

a longitudinal plunger bore disposed into the plunger extending rearwardly from the forward face along the longitudinal axis forming a plunger inner bore wall and terminating at a terminating end face that is generally perpendicular to the longitudinal axis of the plunger, wherein the plunger bore is adapted to receive a second tool bit shank having a second cross-sectional profile smaller than the first cross-sectional profile; and an elastic body disposed between the rearward end of the plunger and the terminating face of the longitudinal hub bore, wherein the elastic body acts to bias the plunger towards the forward end of the hub into a first plunger position.

2. The quick-release chuck assembly of claim 1, and further comprising:

a locking mechanism engageable with the circumferential groove of each tool bit.

3. The quick-release chuck assembly of claim 2, and further comprising:

a sleeve disposed coaxially about the hub and slidable between a first sleeve position and a second sleeve position, the sleeve engaged with the locking mechanism wherein disposing the sleeve in the first sleeve position engages the locking mechanism with the tool bit so as to prevent extraction of the tool bit from the longitudinal bore and disposing the sleeve in the second sleeve position disengages the locking mechanism from the tool bit so as to allow extraction of the tool bit from the longitudinal bore.

4. The quick-release chuck assembly of claim 3 wherein the locking mechanism comprises:
   a radial hub bore communicating with the longitudinal hub bore through the hub;
   a detent ball disposed within the radial bore and extendable into the longitudinal hub bore;
   a locking ring for engaging and urging the detent ball into the longitudinal hub bore and against the first tool bit or the second tool bit; and
   a spring means for biasing the sleeve to the first sleeve position against the locking ring to engage and urge the detent ball into the longitudinal hub bore.

5. The quick-release chuck assembly of claim 4, wherein the plunger has a radial plunger bore communicating with the longitudinal plunger bore, the radial plunger bore is in substantial alignment with the radial hub bore thereby permitting the detent ball to contact the second tool bit within the longitudinal hub bore through the radial plunger bore.

6. The quick-release chuck assembly of claim 2, and further comprising:
   a sleeve disposed coaxially about the hub and slidable between a first sleeve position and a second sleeve position, the sleeve engaged with the locking mechanism wherein disposing the sleeve in the first sleeve position disengages the locking mechanism with the tool bit so as to allow extraction of the tool bit from the longitudinal bore and disposing the sleeve in the second sleeve position engages the locking mechanism from the tool bit so as to prevent extraction of the tool bit from the longitudinal bore.

7. The quick-release chuck assembly of claim 1 wherein the elastic body is a compressive spring.

8. The quick-release chuck assembly of claim 1 wherein the plunger is slidable within the longitudinal hub bore between a first plunger position and a second plunger position, in the first plunger position the forward face of the plunger is positioned adjacent the forward end of the hub and in the second plunger position the rearward end of the plunger is positioned adjacent the terminating face of the longitudinal hub bore.

9. The quick-release chuck assembly of claim 8, and further comprising:
   an annular shoulder being a circumferential rim about the forward face formed from the longitudinal plunger bore, the shoulder for abutment against the first tool bit shank, whereby the first tool bit shank slidably disposes the plunger from the first plunger position to the second plunger position.

10. The quick-release chuck assembly of claim 1 wherein the longitudinal plunger bore has an aperture extending through the terminating end face of the plunger having a cross-sectional profile smaller than a cross-sectional profile of the longitudinal plunger bore, the aperture forming a second inner bore wall for receiving a tool bit having a cross-sectional profile smaller than the second cross-sectional profile of the second tool bit.

11. The quick-release chuck assembly of claim 1, and further comprising:
   a pin positioned within the longitudinal hub bore and extending between the terminating face of the longitudinal hub bore and within the longitudinal plunger bore adjacent a terminating end face of the plunger when the plunger is in the first plunger position.

12. A method for the insertion and extraction of a plurality of tool bits from a quick-release chuck assembly, the method comprising:
   inserting a first tool bit into a longitudinal hub bore of a hub, the longitudinal hub bore having a first profile;
   contacting a plunger with the first tool bit, the plunger being slidably disposed within the longitudinal hub bore;
   displacing the plunger from a first plunger position to a second plunger position;
   extracting the first tool bit from the longitudinal hub bore, whereby the plunger is disposed from the second plunger position to the first plunger position;
   inserting a second tool bit having a smaller profile than the first tool bit into a longitudinal plunger bore of the plunger, the longitudinal plunger bore having a second profile smaller than the first profile of the longitudinal hub bore; and
   extracting the second tool bit from the longitudinal plunger bore.

13. The method according to claim 12, and further comprising:
   sliding a sleeve disposed about the hub from a first sleeve position to a second sleeve position wherein the second sleeve position disengages a locking mechanism to allow insertion of the first tool bit into the longitudinal hub bore;
   sliding the sleeve from the second sleeve position to the first sleeve position, wherein the first sleeve position engages the locking mechanism to prevent extraction of the first tool bit from the longitudinal hub bore; and
   sliding the sleeve from the first sleeve position to the second sleeve position thereby disengaging the locking mechanism to allow extraction of the first tool bit from the longitudinal hub bore.

14. In a quick release chuck assembly of the type in which a hub has a forward end and a longitudinal hub bore disposed into the forward end of the hub forming a bore wall and terminating end face, the longitudinal hub bore adapted to receive and retain a first tool bit having a first cross-sectional profile, the improvement comprising:
   a plunger slidably disposed within the longitudinal hub bore, the plunger having a front end proximate the forward end of the hub and a rear end, the plunger being in fixed rotational engagement with the bore wall of the longitudinal hub bore;
   a longitudinal plunger bore disposed into the front end of the plunger, the longitudinal plunger bore adapted to receive a second tool bit having a second cross-sectional profile smaller than the first cross-sectional profile of the first tool bit; and
   an elastic body disposed between the rear end of the plunger and the terminating end face of the longitudinal hub bore, the elastic body acts to bias the plunger toward the forward end of the hub to a first plunger position.

15. The method according to claim 12, and further comprising:
   sliding a sleeve disposed about the hub from a first sleeve position to the second sleeve position, thereby disengaging a locking mechanism to allow insertion of the second tool bit into the longitudinal plunger bore;
   sliding the sleeve from the second sleeve position to the first sleeve position thereby engaging the locking mechanism to prevent extraction of the second tool bit from the longitudinal plunger bore; and sliding the sleeve from the first sleeve position to the second sleeve position thereby disengaging the locking mechanism to allow extraction of the second tool bit from the longitudinal plunger bore.

16. The quick-release chuck assembly of claim 6 wherein the locking mechanism comprises:
   a radial hub bore communicating with the longitudinal hub bore through the hub;
   a detent ball disposed within the radial bore and extendable into the longitudinal hub bore;
   a locking ring for engaging and urging the detent ball into the longitudinal hub bore and against the first tool bit or the second tool bit; and
   a spring means for biasing the sleeve to the first sleeve position against the locking ring to engage and urge the detent ball into the longitudinal hub bore.

17. The improvement of claim 14, and further comprising:
   a pin positioned within the longitudinal hub bore and extending between the terminating end face of the longitudinal hub bore and within the longitudinal plunger bore adjacent a terminating end face of the plunger when the plunger is in the first plunger position.

18. The improvement of claim 14 wherein the plunger is slidable within the longitudinal hub bore between the first plunger position and a second plunger position, in the first plunger position the forward end of the plunger is positioned adjacent the forward end of the hub and in the second plunger position the rear end of the plunger is positioned adjacent the terminating end face of the longitudinal hub bore.

19. The improvement of claim 17, and further comprising:
   an annular shoulder being a circumferential rim about the forward end formed from the longitudinal plunger bore, the shoulder for abutment against the first tool bit shank, whereby the first tool bit shank slidably disposes the plunger from the first plunger position to the second plunger position.

20. The improvement of claim 14 wherein the longitudinal plunger bore has an aperture extending through a terminating end face of the plunger having a cross-sectional profile smaller than a cross-sectional profile of the longitudinal plunger bore, the aperture forming a second inner bore wall for receiving a tool bit having a cross-sectional profile smaller than the second cross-sectional profile of the second tool bit.

21. The quick-release chuck assembly of claim 16, wherein the plunger has a radial plunger bore communicating with the longitudinal plunger bore, the radial plunger bore is in substantial alignment with the radial hub bore thereby permitting the detent ball to contact the second tool bit within the longitudinal hub bore through the radial plunger bore.

* * * * *